UNITED STATES PATENT OFFICE 2,078,143

REGENERATIVE ELECTRIC CELL

Lucien Jules Jumau, Paris, France, assignor to Compagnie Generale d'Electricite, Paris, France No Drawing. Application March 11, 1935, Serial No. 10,480. In Germany March 19, 1934

2 Claims. (Cl. 136—100)

The insoluble salts of lead: the sulphate, phosphate, chloride, bromide, iodide, etc. may be utilized advantageously as depolarizers in electric cells. During discharge of these cells, in fact, there is a reduction of the insoluble lead salt to spongy lead. As the latter has a lower molecular weight than the initial lead salt and its density is greater than the density of this salt, there results, during discharge, progressive increase in porosity. On the other hand, spongy lead being a much better conductor than the lead salts from which it was formed, the conductivity of the positive electrode goes on increasing equally during discharge.

These advantages result in practice in an effective coefficient of the active positive material which is very close to unity. Thus, by discharge, practically all the lead salt can be transformed into spongy lead.

If by suitably selecting the electrolyte, the active material of the positive electrode remains insoluble under all conditions, both at the beginning and at the end of the discharge, since spongy lead is itself also insoluble, a positive electrode very easily recoverable is formed. When the positive material has been reduced to spongy lead by discharge, it is sufficient to oxidize it, which is very easily carried out in the presence of the oxygen of the air, with or without heating. As the spongy lead is transformed into oxide, treatment in the acid of the salt desired (sulphuric, phosphoric, hydro-chloric, hydro-bromic, hydro-iodic acid, and so on) or in a suitable salt of this acid regenerates the initial insoluble lead salt.

The use of a depolarizer of lead sulphate or lead chloride and of a negative zinc electrode is already known. Unfortunately the E. M. F. of these cells is very low since it is only approximately 0.5 volts.

The cells, forming the subject of the present invention, comprise the simultaneous use of a positive electrode with a depolarizer having a base of an insoluble lead salt, of a negative magnesium electrode and a neutral salt solution as electrolyte. Applicant has proved that by using pure magnesium, such as has recently been manufactured, and a suitable electrolyte, the attack of the magnesium in open circuit remains slight.

The combination of magnesium and the depolarizers above mentioned having as a support an unattackable conductor such as lead gives couples the discharge reactions of which are as follows:

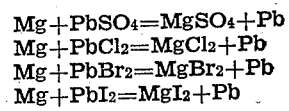

the magnesium going into the form of a soluble salt.

These equations show that, during discharge of these cells, the electrolyte does not take part in the reactions. It is, therefore, not necessary to use an acid or basic electrolyte which would attack the magnesium in open circuit. It is sufficient to use as electrolyte a dilute solution of an alkaline or alkaline-earth salt (sulphate, phosphate, chloride, bromide, iodide, etc.) to obtain sufficient conductivity. This electrolyte may be free or held stationary in known manner. Attack of the magnesium in open circuit is thus very slight and can be still further reduced by protecting the magnesium from the action of the oxygen of the air, for example, either by locating the negative magnesium electrode at the lower part of the cell, or by covering the electrolyte with an impermeable substance such as a layer of oil, or again by hermetically sealing the element.

Such cells may also be mounted in such manner that the electrolyte does not come in contact with the electrodes except at the moment of use. For example, there may be used a container with two compartments, one of which is intended for the electrodes and the other for the electrolyte. The passage of the electrolyte into the electrode compartment is effected at the moment of use, either by simply turning over the container, or by any other known method. There are thus obtained cells of remarkable constancy and particularly adapted for use with portable lamps and especially emergency portable lamps capable of being put instantly into operation and giving great power and great energy.

It is to be noted that 0.45 gr. magnesium per ampere hour is sufficient and that the E. M. F. of the cells is in general from 1.2 to 1.3 according to the choice of the depolarizer and of the electrolyte as also of the concentration of the latter.

Having now particularly described and ascertained the nature of my said invention and in what manner the same is to be performed, I declare that what I claim is:

1. A regenerative electric cell, comprising a positive electrode including a depolarizer consisting of a compound selected from the group consisting of sulphate, chloride, bromide, iodide and phosphate of lead, a magnesium negative electrode, and an electrolyte of a soluble neutral salt, the anion of which is the same as the anion of the depolarizer and the cation of which is a metal selected from the group consisting of the alkali and alkaline-earth metals.

2. A regenerative electric cell, comprising a positive electrode including a depolarizer consisting of a compound selected from the group consisting of sulphate, chloride, bromide, iodide and phosphate of lead, a magnesium negative electrode suitably protected against air oxygen and open-circuit deterioration, and an electrolyte of a soluble neutral salt, the anion of which is the same as the anion of the depolarizer and the cation of which is a metal selected from the group consisting of the alkali and alkaline-earth metals.

LUCIEN JULES JUMAU.